(12) United States Patent
Leppert et al.

(10) Patent No.: US 6,976,498 B2
(45) Date of Patent: Dec. 20, 2005

(54) METHOD OF FITTING A CABLE INTO A PIPE

(75) Inventors: Hans-Detlef Leppert, Mönchengladbach (DE); Klaus Nothofer, Erkrath (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/704,807

(22) Filed: Nov. 12, 2003

(65) Prior Publication Data

US 2004/0118454 A1 Jun. 24, 2004

(30) Foreign Application Priority Data

Nov. 25, 2002 (EP) .................................. 02360322

(51) Int. Cl.$^7$ .......................... F16K 43/00; H02G 1/08
(52) U.S. Cl. .............................. 137/15.13; 137/15.14; 137/317; 137/318; 254/134.3 R; 254/134.4; 405/154.1; 405/174; 405/183.5
(58) Field of Search ..................... 137/15.13, 15.14, 137/317, 318; 254/134.3 R, 134.4, 134 FT; 405/154.1, 158, 168.3, 174, 183.5, 185

(56) References Cited

U.S. PATENT DOCUMENTS

| | | | |
|---|---|---|---|
| 4,649,948 A | * | 3/1987 | Hudson ....................... 137/318 |
| 4,856,937 A | * | 8/1989 | Grocott et al. ............ 405/183.5 |
| 4,917,539 A | * | 4/1990 | de la Salle ............... 405/154.1 |
| 5,121,644 A | * | 6/1992 | Grey et al. ................ 254/134.4 |
| 5,156,376 A | * | 10/1992 | Spicer ....................... 254/134.4 |
| 5,664,610 A | | 9/1997 | Nickens et al. |
| 5,721,373 A | | 2/1998 | Stets et al. |
| 5,971,035 A | * | 10/1999 | Griffioen ...................... 138/155 |
| 6,019,351 A | * | 2/2000 | Allen ........................ 254/134.4 |
| 6,286,542 B1 | * | 9/2001 | Morain et al. .............. 137/317 |
| 6,402,123 B1 | | 6/2002 | Rivard |
| 6,536,463 B1 | * | 3/2003 | Beals et al. ................. 137/318 |
| 2002/0083976 A1 | | 7/2002 | Beals et al. |

FOREIGN PATENT DOCUMENTS

| | | |
|---|---|---|
| EP | 0 450 814 A1 | 10/1991 |
| EP | 0 795 942 B1 | 8/2000 |

OTHER PUBLICATIONS

Fusion Machine Sidewinder Owner's Manual, McElroy Manufacturing, Inc. Manual: SW00301, Revision: A Mar. 1999, pp. 1-1 to 6-1.
Online Article, Saddle Fusion: "Fusing Service Saddles and Tapping Tees", pp. 1-3.
Online Article, DIXON, Welcome to Dixon Industries, "Butt Welding Machines", p. 1 of 1.
Online Article, McElroy Manufacturing Inc., "The LD Sidewinder", pp. 1 of 1.

* cited by examiner

Primary Examiner—Kevin Lee
(74) Attorney, Agent, or Firm—Sughrue Mion, PLLC

(57) ABSTRACT

A method of installing a cable or conduit into at least one plastic pipe of a fluid carrying pipeline system, comprises attaching a first saddle fitting at a first location on said plastic pipe by electro-fusion, opening the pipe at the first location, introducing the cable or a pull body through the saddle fitting into the pipe towards a second location or retrieving at least part of the cable or a pull body introduced at a second location, and pulling the cable directly or by means of the pull body through the pipe. This allows installation of a cable without turning off the fluid supply.

15 Claims, 4 Drawing Sheets

METHOD OF FITTING A CABLE INTO A PIPE

BACKGROUND OF THE INVENTION

The invention relates to a method of installing a cable or conduit into at least one plastic pipe of a pipeline system carrying a fluid.

The main cost when installing new cables, in particular telecommunications cables, arises from the necessary excavations to be performed. If in contrast, the cable is installed in already existing pipes, like gas, drinking water, sewage or heating pipes, only local excavations may be necessary. If installation is to be performed in existing pipes, the service of those pipes should ideally not be interrupted.

In US 2002/0,083,976 A1 a method of introducing a fiber optic conduit into a pressurized gas pipeline is described. A translating member is introduced into the pressurized gas pipe via an entry port in a first drilling fitting attached to the pressurized gas pipeline. Tools are deployed within a first pressure lock housing attached to the first drilling fitting by using a first manipulator located in the first air housing. The duct rod is advanced within the pressurized gas pipeline by a driving mechanism, until a second drilling fitting is reached. The translating member is attached to a fiber optic conduit or cable. The duct rod and fiber optic conduit are then pulled back through the pressurized gas pipeline by the driving mechanism. A conduit or cable is installed in a gas service line, to provide an optical fiber between an optical fiber trunk line or ring and building.

SUMMARY OF THE INVENTION

It is the object of the invention to provide a method and lock system which allows installation of a cable in a pressurized plastic pipe.

In U.S. Pat. No. 5,664,610 a fluid recovery system for accessing the contents of a target container is described. The recovery system includes an auxiliary processing vessel for housing a container to be accessed, a cylindric rupture vessel for housing the auxiliary processing vessel, and a tapping assembly positioned within the cylinder rupture vessel. One or more fluid seals may be formed. The adequacy of a seal can be tested by removing the atmosphere within a seal cup and creating a vacuum prior to drilling.

This object is achieved by attaching a first saddle fitting at a first location on a plastic pipe by electro-fusion, opening the pipe at the first location, introducing a pull body or a cable through the lock system and the saddle fitting into the pipe towards a second location or retrieving at least part of a pull body or of a cable introduced at a second location, pulling the cable by means of the pull body or directly through the pipe and sealing of the cable in the saddle fitting by electro-fusion. The inventive method allows installation of cables, in particular for telecommunications, in plastic pipes at low cost and without having to shut off the fluid supply, p.ex. gas supply. Gas-tight sealing between the saddle fitting and the pipe is obtained by electro-fusion. No additional sealing mechanism is needed. Preferably, the shape of the saddle fitting is adapted to the shape and size of the plastic pipe to which it is to be fused. For electro-fusion to take place, at least the surface of the saddle fitting touching the plastic pipe is made of plastic as well. Preferably, both the pipe and the surface of the saddle fitting used for electro-fusion are of the same material. It is particularly advantageous, if the whole saddle fitting is made of plastic material, in particular high density polyethylene (HDPE).

Within the scope of the invention also falls attaching a lock system to the saddle fitting either before or after electro-fusing the saddle fitting to the pipe. Furthermore, the lock system can comprise the saddle fitting as an integrated part. At the second location a fitting may be installed and the pipe may be opened as well. The pull body can, p. ex. be introduced via the lock system and the first saddle fitting into the pipe at the first location and retrieved at the second location. There, a cable or conduit can be attached to the free end of the pull body and the cable can be pulled from the second location to the first location and through the opening at the first location. Obviously, the pull body could also be introduced at the second location and be retrieved at the second location, where a cable or conduit could be connected and the cable or conduit could subsequently be pulled to the second location. Alternatively, the cable or conduit could be connected to the opposite end of the pull body. The pull body could be transferred from the first to the second location and the cable could be pulled from the first to the second location after the pull body. The fitting at the second location could be attached to a pipe branch.

In a preferred variant of the invention, at the second location a saddle fitting is attached by electro-fusion. Thus, the same components can be used at both locations and a lock system can also easily be installed at the second location. Use of a second electro-fusion saddle fitting allows opening the pipe at any point and is not restricted to pipe branches. Advantageously, an identical lock system is also used at the second location, which further reduces the number of different parts needed for installing a cable in a plastic pipe.

In a further variant of the invention the pipe is opened by drilling at the first and/or second location. Drilling is the preferred method for providing an opening in the pipe through which the cable can be fed.

It is particularly advantageous, if a vacuum is provided during drilling. The vacuum causes dirt generated during drilling to be collected outside the pipe. It prevents dirt falling into the pipe and thus contamination of the material flowing in the pipe.

The drilling of one or both openings in the pipe comprises opening a lower valve and launching the drilling system from a lock room into the saddle fitting region, drilling a hole into the pipe wall, pulling back the drilling system into the lock room, and closing the lower valve. This procedure prevents venting the pipe system and large amounts of fluid carried in the pipe system to escape. Thus, there is no pressure drop in the pipe which could affect the end users of the pipe system. The drilling system can be kept within the lock room, p. ex. in a lock chamber. Alternatively, an upper valve could be provided at the lock room. While the lower valve is closed, the drilling system could be introduced into the lock room. After closing the upper valve, the lower valve could be opened and the drilling be performed. After retrieving the drilling system into the lock room and closing of the lower valve, the drilling system could be removed after opening the upper valve. A pressure drop in the main pipe system can thus be avoided. Furthermore, a smaller lock room could be used if the drilling system, in addition to other components, is not stored in the lock room.

The cable is preferably installed by following the same sequence of opening and closing the valves for lowering a pull body, p.ex. a parachute attached to a pulling line, into the pipe. The pull body is driven by the gas stream to the second location, where it is collected by a catching device, which is lowered into the pipe at the second location using the same sequence of steps as for lowering the drilling system and the pull body. Alternatively, if the cable is introduced into the pipe system, directly i.e. without using a pull body, the cable can be retrieved by the catching device. The catching device can thus be adapted to either retrieve a parachute, a pulling line, a guiding line or the cable. Preferably, the catching device consists of a flexible tube, which has the same outside diameter as the cable to be introduced into the pipe. The catching device having the same outer dimensions as the cable has the advantage that the catching device can be introduced into the already installed electro-fusion saddle fitting and/or lock system. Advantageously, the catching device comprises an image guide and an illumination means. Preferably, the illumination means is a cold light source. Furthermore, the catching device comprises at its end a tool, in particular a gripping tool, which can be manipulated by a user installing the cable into the pipe by means of a manipulator. Catching of the pull body or cable is facilitated by illuminating the inside of the pipe via the illumination means and imaging via the image guide. The user can thus see where the pull body or cable is located in the pipe and where to grip the cable or pull body with the tool.

In a preferred variant of the inventive method, the cable is sealed in one or both fittings, in particular by electro-fusion. Thus, a fluid-tight connection is obtained between the saddle fitting and the cable. Hence, with the cable being installed, fluid cannot escape from the pipe system at the first and second location. In order to enable sealing by electro-fusion, the outermost layer of the cable is at least in the sealing region made of plastic.

In further preferred variant of the invention the cable is introduced in a fluid-tight manner. If the cable is sealed against the pipe or fitting during installation of the cable, the fluid supply does not have to be turned off during installation. Hence, the service of the pipeline system is not interrupted during installation of the cable.

Within the scope of the invention also falls an electro-fusion saddle fitting comprising a stem, which comprises a pneumatic seal and/or an electro-fusion fitting for sealing against a cable fed through the stem. Such a saddle fitting facilitates installation of a cable in pipes without turning off the fluid supply. If the stem comprises a seal, in particular a pneumatic seal, the cable is sealed against the saddle fitting during installation of the cable, i.e. while the cable is pulled or pushed through the pipe. A pneumatic seal can be inflatable and hence easily adapted to the cable diameter. Advantageously the same pneumatic seal can be used for different cable diameters. Furthermore, the stem can comprise an electro-fusion fitting. The electro-fusion fitting can be an integral part of the stem or it can be a separate part, which can be pushed over the free end of the stem with one end and which can guide the cable with the other end. The electro-fusion fitting can be fused to the cable (integral part) or fused to both, the stem and the cable (separate part) in order to form a fluid-tight connection between the stem and the cable.

In a preferred embodiment the saddle fitting is connected to a hydraulic feeding system. The hydraulic feeding system can be connected to the saddle fitting, in particular to the stem of the saddle fitting directly or to the lock system connected to the saddle fitting. By means of the hydraulic feeding system the cable can be pushed into the pipe or pulled out of the pipe. To this end the hydraulic feeding system comprises a first and a second seal, in particular a first and second hydraulic seal. Between the seals is provided a hydraulic mechanism. For feeding the cable into the pipe system the first seal opens while the second seal seals against the cable and thereby grips the cable. The hydraulic mechanism then moves the second seal towards the first seal. Thereby the cable is also moved towards the first seal. At the end of this process the first seal seals against the cable and thereby grips the cable and the second seal opens and is moved back along the cable by the hydraulic mechanism. For pulling the cable through a pipe system the hydraulic feeding system operates in opposite direction.

Alternatively, the saddle fitting or an intermediate lock system can be connected to a fluid-tight container system. The cable to be installed is located in a fluid-tight container. The container is connected to the saddle fitting in a fluid-tight manner. Hence, the cable can be introduced into the pipe system without the fluid supply in the pipe system having to be turned off.

The objective is also solved by a lock system for installing a cable or conduit into at least one plastic pipe of a pressurized pipeline system comprising a lock room and an upper valve, in particular a sphere valve, provided at one end of the lock room and a lower valve, in particular a sphere valve, provided at the opposite end of the lock room. This allows performing the necessary steps of installing a cable in a pressurized pipe without too much of the fluid carried in the pipe escaping. A sphere or ball valve has the advantage that the inner diameter of the sphere valve, when opened, corresponds to the inner diameter of the tubular part it is attached to.

In a preferred embodiment the lock room comprises a driller and/or a pull body and/or a parachute. The equipment needed for installing a cable, i.e. for opening the pipe and for pulling the cable from one location of the pipe to another can be stored and arranged in the lock room. Different lock chambers can be provided in the lock room for the different stored parts. The pull body can, p. ex. be a guide line or pulling rope. A parachute can be connected to the pull body and therefore be an integrated part of the pull body. Thus, opening of the upper valve is only necessary to supply additional equipment to the lock room. Most operations can be carried out without having to open the upper valve. The lock room could also be of such a size that a spool of thread as well as the cable can be stored in the lock room. Thus, additional fittings could be avoided.

In a particularly preferred embodiment the lower valve is connected to the stem of a fitting, in particular an electro-fusion saddle fitting. The saddle fitting can be directly fused to the plastic pipe. This is an easy and effective means of attaching the fitting to the pipe. It also provides a fluid tight connection to the plastic pipe.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE DRAWINGS

Figure 1:
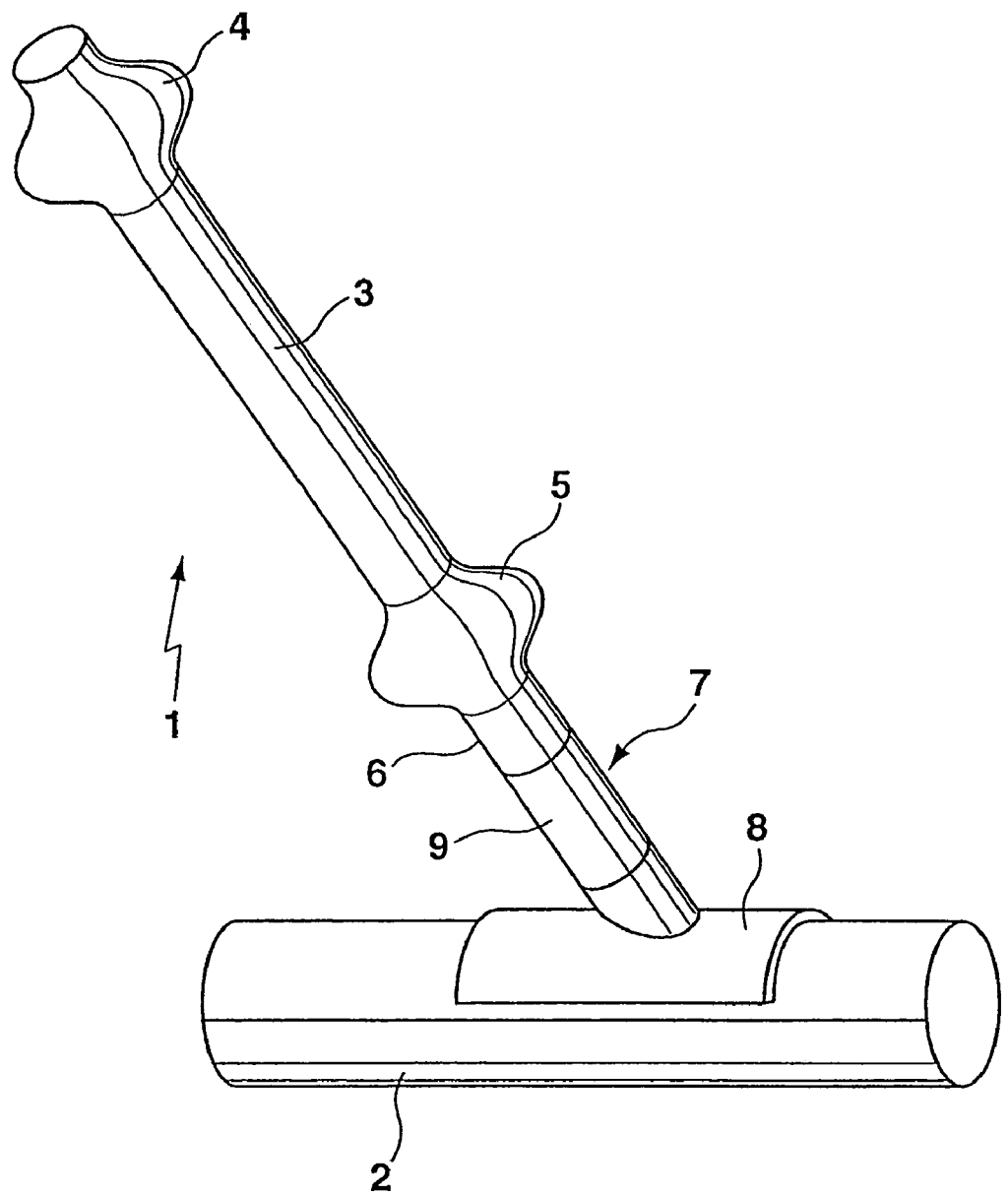
FIG. 1 shows a perspective view of a lock system for installing a cable in a pressurized pipe.

FIG. 1 shows a perspective view of a lock system 1 for installing a cable in a pressurized plastic pipe 2, in particular a gas pipe. The lock system 1 comprises a lock room 3 having an upper valve 4, in the embodiment a ball valve, at one end and at the opposite end a lower valve 5, in the embodiment also a ball valve. The lower valve 5 is connected to a seal 6 to be described in more detail later, which is integrated in a stem 7 of a saddle fitting 8. The saddle fitting 8 is realized as a fusion saddle fitting, i.e. the saddle fitting 8 is attached to the outside of the plastic pipe 2 by electro-fusion. Incorporated in the stem 7 is an electro-fusion fitting 9, which can be electro-fused to the installed cable.

For installing a cable, first a working well may have to be excavated for obtaining access to the pipe 2. Then the gas pipe 2 may have to be cleaned at the outside. Then the fusion saddle fitting 8 with integrated fusion fitting 9 and seal 6 is installed by fusing the fusion saddle fitting 8 to the plastic pipe 2. After that the lower valve 5 together with the lock space 3 and the upper valve 4 is attached to the saddle fitting 8. This is followed by launching a pneumatic and/or manual drilling system (not shown) at first through the opened upper valve 4 into the lock space 3. After closing the upper valve 4, the lower valve 5 is opened and the drilling system is lowered into the stem 7 through the seal 6. A vacuum is created in the stem 7 and a hole is drilled into the wall of the pipe 2. The vacuum is needed to collect the drilling dirt. After drilling, the drilling system is pulled back through the seal 6 and the lower valve 5 into the lock space. The lower valve 5 is then closed, so gas cannot escape. Then the upper valve 4 is opened and the drilling system removed. After that a pull body, in particular a guiding line or pulling rope connected to a parachute are launched into the pipe using the same sequence of opening and closing the valves 4, 5 as for the drilling system. The parachute is transported in the pipe 2 by the gas flow due to a pressure difference. At a second lock system, downstream from the one shown in FIG. 1, the parachute is caught by a catching device and the parachute and the line attached thereto are moved into the lock space of the second lock system. There, a cable is attached to the pull body and the cable is pulled via the pull body from the second lock system to the first lock system 1. The seal 6 and a seal in the second lock system prevent gas escaping while the cable is being pulled from the second lock system to the first. Once the cable is pulled through the pipe 2, the cable is sealed against the stem 7 of the saddle fitting 8 by means of the fusion fitting 9. The cable is also sealed against the stem of a saddle fitting at the second lock system. Subsequently, the lock space 3 and the valves 4, 5 can be removed and used for installation of a cable at a different place.

Figure 2:
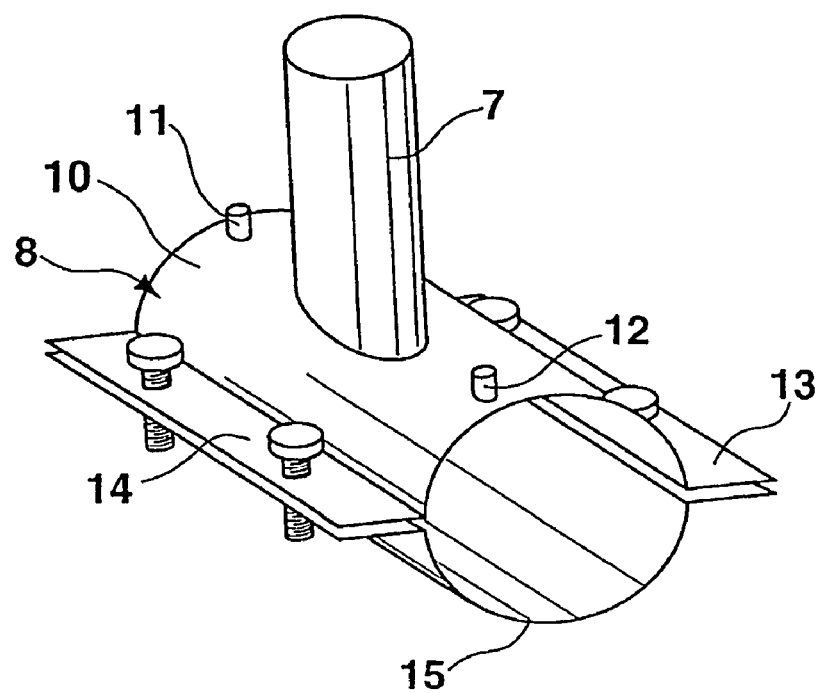
FIG. 2 shows a perspective view of a saddle fitting.

FIG. 2 shows a perspective view of the saddle fitting 8, which comprises a fusion plate 10 and the stem 7 connected to the fusion plate 10. Electrical connectors 11, 12 are provided, to which electrodes can be connected to effect the fusion process. Lateral flanges 13, 14 and a corresponding back plate 15 are provided for clamping the saddle fitting 8 to the pipe prior to and during fusion to the pipe.

Figure 3:
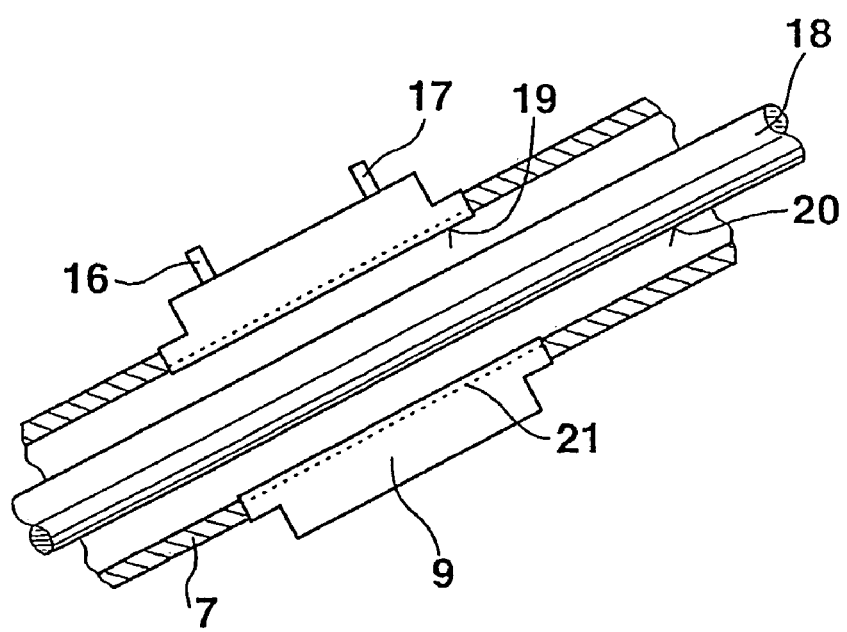
FIG. 3 shows a cross-section through a first electro-fusion fitting.

FIG. 3 shows a cross-section through the stem 7 and integrated fusion fitting 9. The fusion fitting 9 comprises electrical connectors 16, 17 to which electrodes can be connected to effect the fusion process. The fusion fitting 9 has an annular shape, the inner diameter of which is slightly larger than the outer diameter of the cable 18. Thus, the cable 18 can be pushed or pulled through the fusion fitting 9 during installation. After installation the inner surface 19 of the fusion fitting 9 is electro-fused to the outer surface 20 of the cable 18. To this end, the fusion fitting 9 comprises a winding of a wire 21 close to its inner surface 19. After fusion, a gas-tight seal between the cable and the stem 7 is obtained, so gas cannot escape from the pipe.

Figure 4:
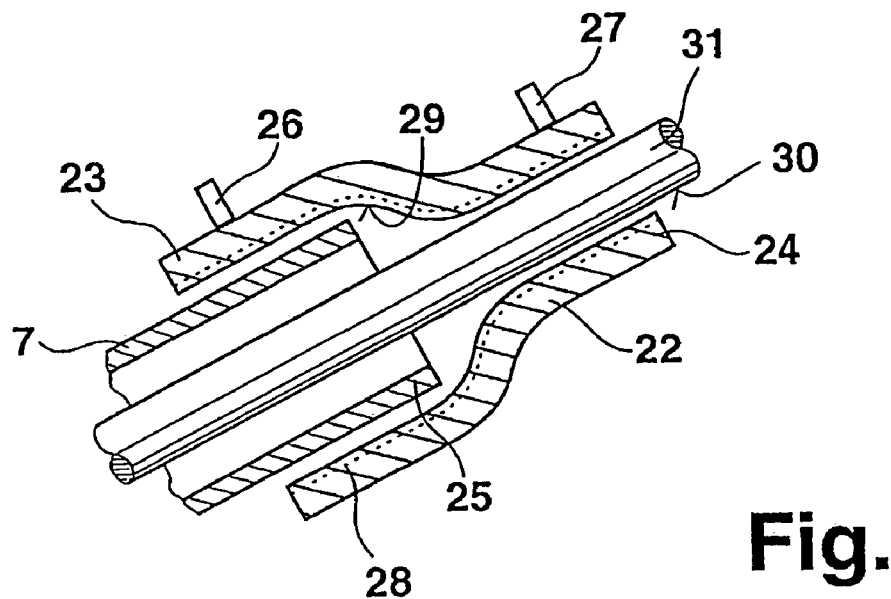
FIG. 4 shows a cross-section through a second electro-fusion fitting.

FIG. 4 shows a cross-section of an alternative embodiment. The fusion fitting 22 is not integrated with the stem 7, but a separate element. With one end 23, having a larger diameter than the opposite end 24, the fusion fitting 22 is pushed over the free end 25 of the stem 7. The fusion fitting 22 is provided with electrical connectors 26, 27 being in contact with a winding of a resistance heating wire 28 located in the vicinity of the inner surface 29 of the fusion fitting 22. By supplying a current to the wire 28 through the electrical connectors 26, 27, the heat necessary for fusion is generated by resistance heating. Thus, the end 23 of the fusion fitting 22 is fused to the outer surface of the stem 7. At the same time the opposite end 24 is fused to the outer surface 30 of the cable 31. Consequently, a gas-tight seal between the stem 7 and the cable 31 is obtained.

Figure 5:
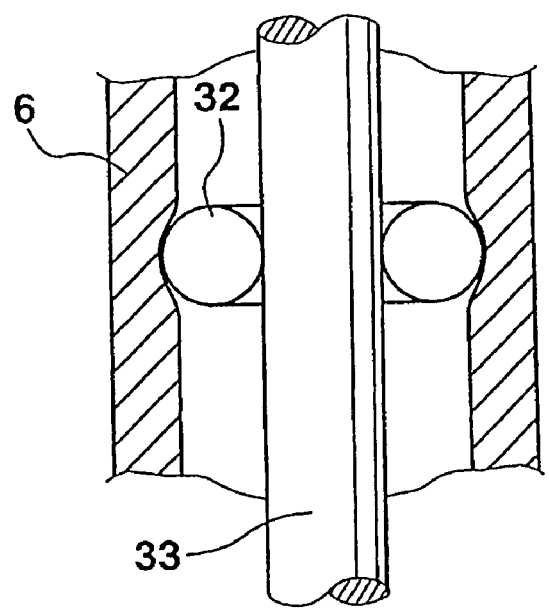
FIG. 5 shows a cross-section through a pneumatic seal.

In FIG. 5 a cross-section through the seal 6 is shown. The seal 6 is implemented as a dynamic seal, in particular as a pneumatic seal. The seal 6 consists of a sealing ring 32, which is arranged inside the stem 7. The sealing ring 32 has an opening through which the cable 33 is guided. The sealing ring 32 is inflatable and can thus be adapted to different diameters of the cable 33.

Figure 6:
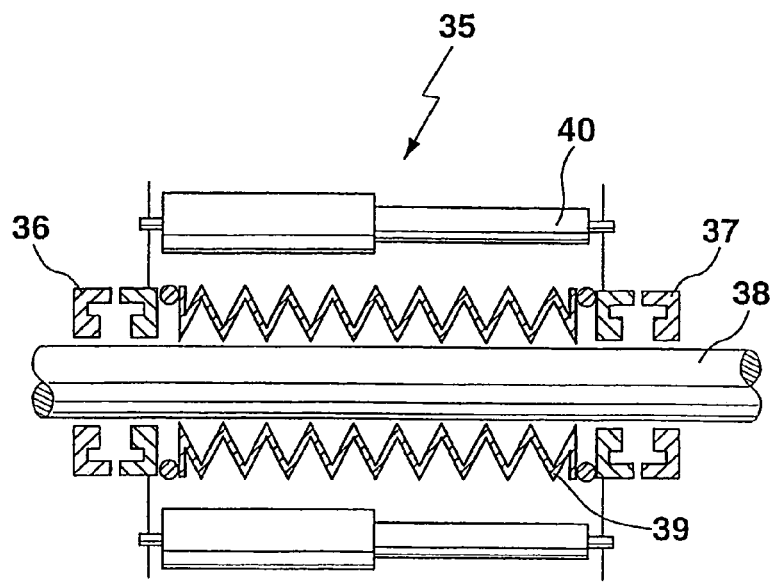
FIG. 6 shows a cross-section through a hydraulic feeding system.

In FIG. 6 a cross section through a hydraulic feeding system 35 is shown. The hydraulic feeding system 35 comprises a first and a second hydraulic seal 36, 37 which can both seal against a cable 38. Between the first and second seal 36, 37, is provided an expandable sleeve 39 which forms a sealing engagement with seals 36, 37, respectively. Between the first and second seal 36, 37, is further provided a hydraulic system 40. The hydraulic feeding system 35 can be used for either pushing the cable 38 into a pipe system or pulling the cable 38 from a pipe system. For pushing the cable 38 to the left the hydraulic seal 36 is in an open position and the second seal 37 seals against the cable 38 and thereby grips the cable 38. Via the hydraulic system 40, the second seal 37 and thus the cable 38 are moved towards the first seal 36. Once the second seal 37 is located in the vicinity of the first seal 36, it seals against cable 38 and thereby grips cable 38. Seal 37 is released and the hydraulic system 40 pushes seal 37 back into its former position. This process is repeated until the cable 38 is pushed into the pipe system far enough. For pulling the cable 38 from a pipe system to the right, first seal 36 seals against cable 38 and thereby grips the cable 38. The hydraulic system 40 moves first seal 36 towards the second seal 37, which is in an open position. Due to the movement of the seal 36 the cable 38, which is gripped by seal 36, is moved to the right. Once the seal 36 is located in the vicinity of the seal 37, the seal 37 closes and seals against the cable 38. Thereby seal 37 holds cable 38 in place. The hydraulic system 40 moves the seal 36 back along the cable 38 into its original position with the seal 36 being open. Obviously, the seal 36, 37, which is not moved during the pulling or pushing process, needs to be fixed in space.

Figure 7:
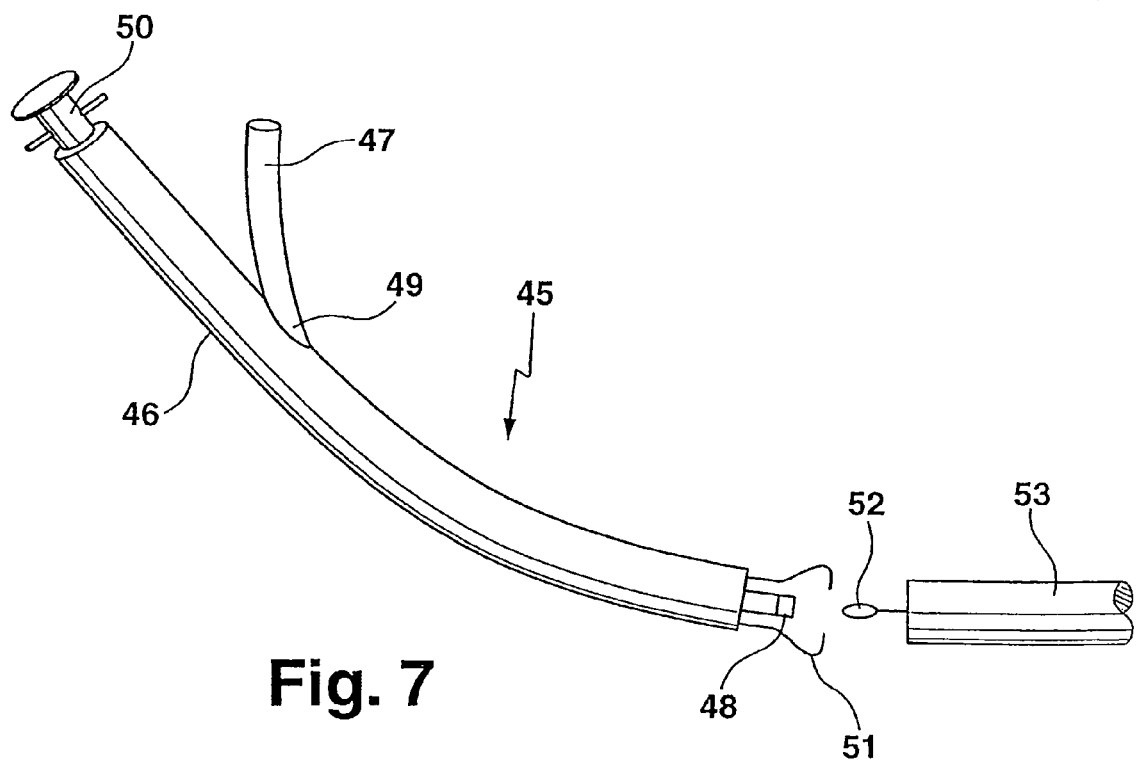
FIG. 7 shows a cross-section through a catching device.

FIG. 7 shows a plan view of a catching device 45 which can be introduced through the stem 7 of a saddle fitting 8. The catching device 45 is made of a flexible tube 46. Partly within the flexible tube 46 is provided an imaging guide 47 which comprises at its end an illumination means 48, embodied by a cold light source. The image guide 47 exits the flexible tube 46 at point 49 and can be used to visually guide the catching device 45 in the pipe. At one end of the catching device 45 is provided a manipulator 50 which can be used to operate a tool 51 in order to grip a hook 52 connected to a pull body 53. Once the tool 51 grips hook 52, the pull body 53 can be pulled through the saddle fitting and the stem of the saddle fitting. A cable can be attached to hook 52 and the cable can be pulled back through the pipe system via the pull body 53. Preferably the diameter of the flexible tube corresponds to the diameter of the cable to be installed.

What is claimed is:

1. A method of installing one of a cable and conduit into at least one plastic pipe of a fluid carrying pipeline system, comprising the following steps:
   a) attaching a first saddle fitting at a first location on said plastic pipe by electro-fusion;
   b) opening the pipe at the first location;
   c) introducing the cable or a pull body through the saddle fitting into the pipe towards a second location or retrieving at least part of the cable or a pull body introduced at a second location;
   d) pulling the cable directly or by means of the pull body through the pipe,
   e) sealing of the cable (18; 31; 33; 38) in the saddle fitting by electro-fusion, wherein the saddle fitting comprises a saddle plate and a stem connected with said saddle plate, and said cable fed through said saddle fitting is sealed inside said stem of said saddle plate by electro-fusion of an annular electro-fusion fitting integrated with said stem.

2. Method according to claim 1, wherein at the second location a second saddle fitting is attached by electrofusion.

3. Method according to claim 1, wherein the pipe is opened by drilling at the first and/or second location.

4. Method according to claim 3 wherein a vacuum is provided during drilling.

5. Method according to claim 3, wherein the drilling comprises the following steps:
   a. opening a lower valve and launching the drilling system from a lock room into the saddle fitting region,
   b. drilling a hole into the pipe wall,
   c. pulling back the drilling system into the lock room,
   d. closing the lower valve.

6. Method according to claim 1, wherein the cable or pull body is retrieved by a catching device.

7. Method according to claim 1, wherein the cable is sealed in both fittings by electro-fusion.

8. Method according to claim 1, wherein the cable is introduced in a fluid-tight manner.

9. An electro-fusion saddle fitting, in particular for performing the method of installing a cable or a conduit into a plastic pipe, according to claim 1, comprising a stem connected with a saddle plate arranged for attaching onto the plastic pipe by electro-fusion, wherein the stem comprises a pneumatic seal and/or an electro-fusion fitting integrated with the stem arranged for sealing a cable fed through the fitting by fusing the electro-fusion fitting to the cable by electro-fusion inside the stem.

10. Electro-fusion saddle fitting according to claim 9, wherein the saddle fitting is connected to a hydraulic feeding system.

11. Electro-fusion saddle fitting according to claim 8, wherein the saddle fitting is connected to a fluid-tight container system.

12. Lock system for installing a cable or conduit into at least one plastic pipe of a pressurized pipeline system, in particular for performing the method according to claim 1, comprising a lock room and an upper valve, in particular a sphere valve, provided at one end of the lock room and a lower valve, in particular a sphere valve, provided at the opposite end of the lock room.

13. Lock system according to claim 12, wherein the lock room comprises a driller and/or a pull body and/or a parachute and/or a catching device.

14. Lock system according to claim 12, wherein the lock system comprises a fining, in particular a saddle fitting, wherein the lower valve is connected to the stem of the fitting.

15. An electro-fusion saddle fining according to claim 9, wherein the saddle plate includes a fusion plate for attaching the fitting onto the plastic pipe by electro-fusion.

* * * * *